US012505943B2

(12) United States Patent
Vilenskiy et al.

(10) Patent No.: US 12,505,943 B2
(45) Date of Patent: Dec. 23, 2025

(54) MULTILAYER INDUCTOR

(71) Applicant: Samsung Electronics Co., Ltd., Suwon-si (KR)

(72) Inventors: Artem Rudolfovitch Vilenskiy, Moscow (RU); Mikhail Nikolaevich Makurin, Moscow region (RU); Chongmin Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 876 days.

(21) Appl. No.: 17/704,663

(22) Filed: Mar. 25, 2022

(65) Prior Publication Data

US 2022/0215992 A1 Jul. 7, 2022

Related U.S. Application Data

(63) Continuation of application No. PCT/KR2020/013117, filed on Sep. 25, 2020.

(30) Foreign Application Priority Data

Sep. 25, 2019 (RU) ........................... RU2019130165

(51) Int. Cl.
*H01F 27/28* (2006.01)
*H01F 1/34* (2006.01)
(Continued)

(52) U.S. Cl.
CPC ............... *H01F 1/344* (2013.01); *H01F 3/14* (2013.01); *H01F 17/0013* (2013.01); *H02J 50/12* (2016.02); *H01F 2017/002* (2013.01)

(58) Field of Classification Search
CPC ........ H01F 1/344; H01F 3/14; H01F 17/0013; H01F 2017/002; H01F 2027/2809;
(Continued)

(56) References Cited

U.S. PATENT DOCUMENTS 5,880,662 A * 3/1999 Person ................ H01F 17/0013
336/200
9,712,209 B2 7/2017 Kim et al.
(Continued)

FOREIGN PATENT DOCUMENTS

GB 2528788 B 5/2017
JP 2006-196591 A 7/2006
(Continued)

OTHER PUBLICATIONS

International Search Report dated Jan. 7, 2021, issued in International Patent Application No. PCT/KR2020/013117.
(Continued)

*Primary Examiner* — Shawki S Ismail
*Assistant Examiner* — Kazi S Hossain
(74) *Attorney, Agent, or Firm* — Jefferson IP Law, LLP

(57) ABSTRACT

A multilayer inductor is provided. The multilayer inductor includes a multilayer winding portion comprising a plurality of coil layers that are vertically stacked, and having an inner surface that defines a hollow of the plurality of coil layers and having an outer surface that defines an outer side and a magnetic compensator made of a soft magnetic material and comprising a magnetic wall located at at least one of the inner surface or the outer surface of the multilayer winding portion.

13 Claims, 21 Drawing Sheets

(51) Int. Cl.

| | |
|---|---|
| ***H01F 3/14*** | (2006.01) |
| ***H01F 17/00*** | (2006.01) |
| ***H02J 50/12*** | (2016.01) |

(58) Field of Classification Search

CPC ............ H01F 17/0033; H01F 27/2804; H01F 27/366; H01F 38/14; H01F 2017/008; H01F 1/34; H01F 2005/046; H01F 2017/004; H01F 27/36; H02J 50/12; H02J 50/10; H02J 50/005

USPC ......................................... 336/200, 232, 192

See application file for complete search history.

(56) References Cited

U.S. PATENT DOCUMENTS

| | | | |
|---|---|---|---|
| 10,910,864 B2 | 2/2021 | Kim et al. | |
| 11,094,456 B2 | 8/2021 | Wang et al. | |
| 2011/0198940 A1 | 8/2011 | Urano | |
| 2014/0225705 A1 * | 8/2014 | Kim .................... | H01F 27/2871 336/232 |
| 2019/0058349 A1 | 2/2019 | Kim et al. | |
| 2021/0287849 A1 * | 9/2021 | Kawaguchi ....... | H02M 3/33569 |

FOREIGN PATENT DOCUMENTS

| | | | |
|---|---|---|---|
| JP | 2011-086655 | A | 4/2011 |
| JP | 2011-086890 | A | 4/2011 |
| KR | 10-2001-0023132 | A | 3/2001 |
| KR | 10-2011-0028987 | A | 3/2011 |
| KR | 10-2014-0102119 | A | 8/2014 |
| RU | 2 524 920 | C1 | 7/2014 |
| WO | 2017/164476 | A1 | 9/2017 |

OTHER PUBLICATIONS

Russian Office Action dated Feb. 21, 2020, issued in Russian Patent Application No. 2019130165.

Korean Office Action dated Nov. 19, 2024, issued in Korean Patent Application No. 10-2020-0125086.

Korean Notice of Allowance dated Jan. 22, 2025, issued in Korean Patent Application No. 10-2020-0125086.

* cited by examiner

MULTILAYER INDUCTOR

CROSS-REFERENCE TO RELATED APPLICATION(S)

This application is a continuation application, claiming priority under § 365(c), of an International application No. PCT/KR2020/013117, filed on Sep. 25, 2020, which is based on and claims the benefit of a Russian patent application number 2019130165, filed on Sep. 25, 2019, in the Russian Intellectual Property Office, the disclosure of which is incorporated by reference herein in its entirety.

BACKGROUND

1. Field

The disclosure relates to a multilayer inductor.

2. Description of Related Art

Inductors are circuit elements used to obtain inductance. Inductors are used in various technology fields. For example, inductors are used in wireless power transmission systems (e.g., Qi, AirFuel), energy storage, wireless engineering for noise reduction, resonance and frequency selection circuits, and the like.

A wireless power transmission system is operated at high frequency (e.g., 100 KHZ for Qi, 7 MHZ for AirFuel). At such a high frequency, a conductor is greatly affected by a skin-effect and a proximity effect (adjacent wiring effect or proximity effect). Accordingly, an inductor according to the related art that is manufactured with a solid conductor or a conductor based on a printed circuit board (PCB) exhibits reduced quality factor and efficiency due to the skin-effect and the proximity effect. To remove the effect of the skin-effect or the proximity effect on a conductor, Litz wires may be used. A Litz wire is a stranded wire made of twisted insulated wires. Litz wires are used in electronic devices to transmit alternating current at high operating frequency (e.g., in a wireless frequency band). As a Litz wire has a uniform current distribution and reduced resistance, an inductor made of Litz wire may exhibit a high quality factor and low heat loss. However, as Litz wires use a large number of thin insulated wires, they are relatively expensive and are difficult to manufacture and use. For example, Litz wires are more difficult to solder than general single-core or multi-core wires. Accordingly, a Litz wire-based inductor is expensive, and difficult to manufacture and use. In the related art, a solution to solve the above-described problem is known.

Patent Literature 1 (US2014225705 A1) discloses a planar inductor in which a magnetic medium layer having certain dimensions and a magnetic loss coefficient is disposed. The magnetic medium layer is disposed adjacent to a side surface of a coil. The magnetic medium layer may reduce resistance loss by uniformly redistributing a current across a coil section. However, Patent Literature 1 discloses only a single layer planar inductor having a relatively low quality factor. Furthermore, Patent Literature 1 discloses only an inductor having a circular shape.

Patent Literature 2 (U.S. Pat. No. 9,712,209 B2) discloses a planar spiral inductor that has turns made of strip-form conductors. The coil has at least one turn. A bandwidth of a conductor varies according to a distance in a length direction from the start of a coil. As each coil has a corresponding width, an equal current flows through each coil. However, the above-mentioned solution discloses only a single layer flat inductor having a relatively low quality coefficient.

Patent Literature 3 (GB 2528788 A) discloses a wireless charger having a transmitter and a resonator. The resonator includes a conductive path having at least two loops of a current flow in a first direction and a current flow in a second direction opposite thereto, within a plane. In this solution, coupling efficiency may be improved by adjusting a return path of a magnetic flux by placing ferrite under the resonator. However, in Patent Literature 3, the resonator has a relatively low quality factor due to the uneven current distribution across a cross-section of the loop wiring.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a multilayer inductor having a high quality factor including an operation at high frequency.

Another aspect of the disclosure is to provide a multilayer inductor with simple, compact, and inexpensive design for mass production.

Additional aspects will be set forth in part in the description which follows and, in part, will be apparent from the description, or may be learned by practice of the presented embodiments.

In accordance with an aspect of the disclosure, a multilayer inductor is provided. The multilayer inductor includes a multilayer winding portion including a plurality of coil layers that are vertically stacked, and having an inner surface that defines a hollow of the plurality of coil layers and having an outer surface that defines an outer side, and a magnetic compensator including a soft magnetic material and including a magnetic wall located at at least one of the inner surface or the outer surface of the multilayer winding portion.

In various embodiments, each layer of the plurality of coil layers may include a single-turn or multi-turn field coil.

The magnetic wall may include first and second magnetic walls that are respectively provided on the inner surface and the outer surface of the multilayer winding portion, and the magnetic compensator may further include a lower magnetic portion that connects the first and second magnetic walls to each other and on which the multilayer winding portion may be placed.

The soft magnetic material of the magnetic compensator may be ferrite.

The magnetic wall may be attached to at least one of the inner surface or the outer surface of the multilayer winding portion.

The magnetic wall may be spaced apart from at least one of the inner surface or the outer surface of the multilayer winding portion.

A gap between the magnetic wall and the multilayer winding portion may be an air gap or may be filled with a dielectric material.

The magnetic wall may be perpendicular to a plane on which the plurality of coil layers are placed.

The magnetic wall may include the first and second magnetic walls that are respectively provided on the inner surface and the outer surface of the multilayer winding portion, and the first and second magnetic walls may be parallel to each other.

A surface of the magnetic wall facing the multilayer winding portion may be arranged at an inclined angle with respect to a plane on which the plurality of coil layers are placed.

When viewed from a plane on which the plurality of coil layers are placed, the multilayer winding portion may have an annular shape or a hollow polygonal shape, and the magnetic wall may have an annular shape or hollow polygonal shape corresponding to the shape of the multilayer winding portion.

The multilayer wiring portion may be provided based on a printed circuit board.

The plurality of coil layers may be provided on a multilayer printed circuit board.

The plurality of coil layers may be mutually connected by a metalized via.

Each of the plurality of coil layers may be formed on a single layer printed circuit board, and the plurality of coil layers may be formed by stacking single layer printed circuit boards.

In accordance with another aspect of the disclosure, a wireless power transmission system is provided. The wireless power transmission system includes a power transmitter including a wireless power transmission inductor, and a power receiver including a wireless power receiving inductor, wherein the inductor of the power transmitter and/or the power receiver is the multilayer inductor that includes a multilayer winding portion including a plurality of coil layers that are vertically stacked, and having an inner surface that defines a hollow of the plurality of coil layers and having an outer surface that defines an outer side, and a magnetic compensator including a soft magnetic material and including a magnetic wall located at at least one of the inner surface or the outer surface of the multilayer winding portion.

According to the disclosure, the multilayer inductor may improve the quality factor of an inductor when operating at high operating frequency.

According to the disclosure, the multilayer inductor may be simple and compact.

According to the disclosure, the multilayer inductor may be suitable for mass production and inexpensive.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE OF DISCLOSURE

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms “a,” “an,” and “the” include plural referents unless the context clearly dictates otherwise. Thus, for example, reference to “a component surface” includes reference to one or more of such surfaces.

Figure 1:
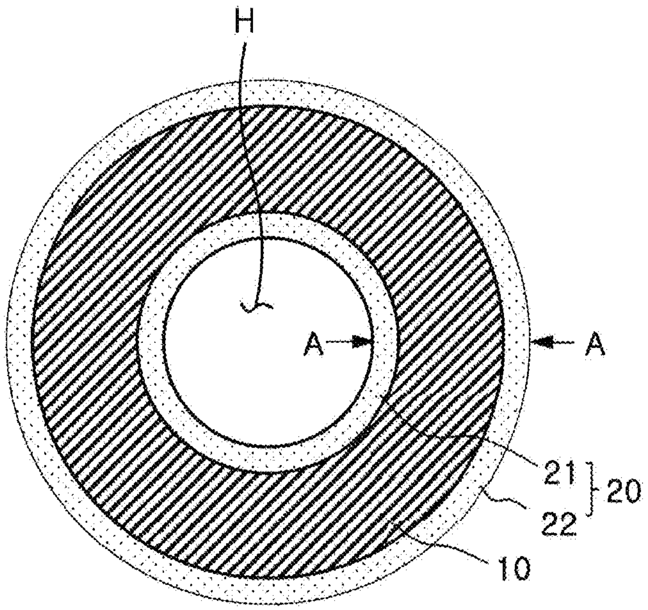
FIG. 1 is a schematic plan view of a multilayer inductor according to an embodiment of the disclosure.

FIG. 1 is schematic plan view of a multilayer inductor according to an embodiment of the disclosure.

Figure 2:
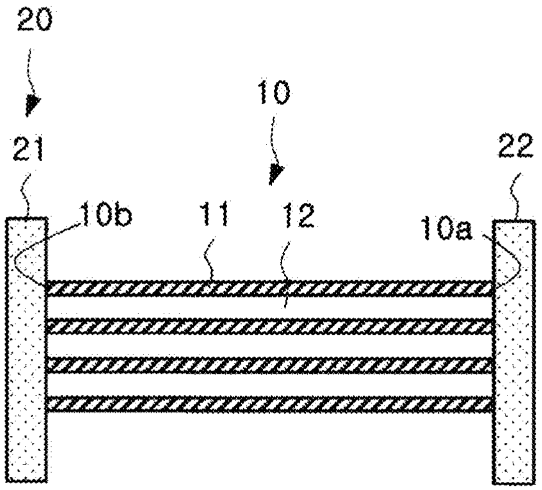
FIG. 2 is a schematic cross-sectional view taken along line A-A of the multilayer inductor of FIG. 1 according to an embodiment of the disclosure.

FIG. 2 is a schematic cross-sectional view of the multilayer inductor of FIG. 1 taken along like A-A according to an embodiment of the disclosure.

Referring to FIGS. 1 and 2, the multilayer inductor of the present embodiment includes a multilayer winding portion 10 and a magnetic compensator 20.

The multilayer winding portion 10 may be formed by vertically stacking coil layers 11. Each layer of the coil layers 11 may include a single-turn or multi-turn field coil. The field coil may mean a coil that generates a magnetic field. For example, a circular flat coil may be a field coil. As the coil layers 11 have a shape of a winding coil, the multilayer winding portion 10 may have an inner surface 10*a* that defines a cylindrical hollow H and an outer surface 10*b* that is cylindrical. Although FIG. 2 illustrates that the multilayer winding portion 10 consists of four coil layers 11, the disclosure is not limited thereto.

A dielectric 12 may be provided between the coil layers 11. The coil layers 11 may be formed based on a printed circuit board. In an embodiment, the coil layers 11 may be formed as a multilayer printed circuit board. In other words, the coil of the coil layers 11 may be formed as a circuit of each layer of a multilayer printed circuit board. In this case, as in an embodiment with reference to FIG. 19 and FIG. 20, coils provided on the respective layers of a multilayer printed circuit board may be mutually connected by vias that are metalized. In another embodiment, each of the coil layers 11 may be formed in a conductor layer pattern on a dielectric layer of a single-layer printed circuit board (PCB), and as printed circuit boards on which these circular flat coils are formed are stacked in two or more layers, the multilayer winding portion 10 may be formed. The implementation of the multilayer winding portion 10 on a printed circuit board may be simple and at low cost, which is appropriate to mass production.

The magnetic compensator 20 may be formed of a soft magnetic material. The soft magnetic material is a material in which a domain wall is easily moved, and which is magnetized by applying a small magnetic field.

In an embodiment, the soft magnetic material of the magnetic compensator 20 may be a soft magnetic ferrite.

In an embodiment, the magnetic compensator 20 may be manufactured of an iron-based soft magnetic material, or an amorphous or nanocrystalline alloy-based soft magnetic material.

The magnetic compensator 20 is disposed at at least any one of the inner surface 10*a* and the outer surface 10*b* of the multilayer winding portion 10.

In an embodiment, the magnetic compensator 20 may be first and second magnetic walls 21 and 22 having a cylindrical shape and standing from a plane (hereinafter an inductor plane) on which a plurality of the coil layers 11 are placed.

In an embodiment, each of the first and second magnetic walls 21 and 22 of the magnetic compensator 20, as illustrated in FIG. 2, may be formed in a rectangular cross-sectional shape.

In an embodiment, the first and second magnetic walls 21 and 22 may be perpendicular to the inductor plane and parallel to each other. In another embodiment, the first and second magnetic walls 21 and 22 may be arranged inclined to the inductor plane.

In an embodiment, the first and second magnetic walls 21 and 22 are located close to an edge of the multilayer winding portion 10. The first and second magnetic walls 21 and 22 may each be attached to the inner surface 10*a* and the outer surface 10*b* of the multilayer winding portion 10 without a gap.

FIGS. 1 and 2 illustrate a case in which both of the first and second magnetic walls 21 and 22 are provided, but the disclosure is not limited thereto. In an embodiment, any one of the first and second magnetic walls 21 and 22 may be provided.

The multilayer inductor described above may have a shape of a flat field coil.

Figure 3:
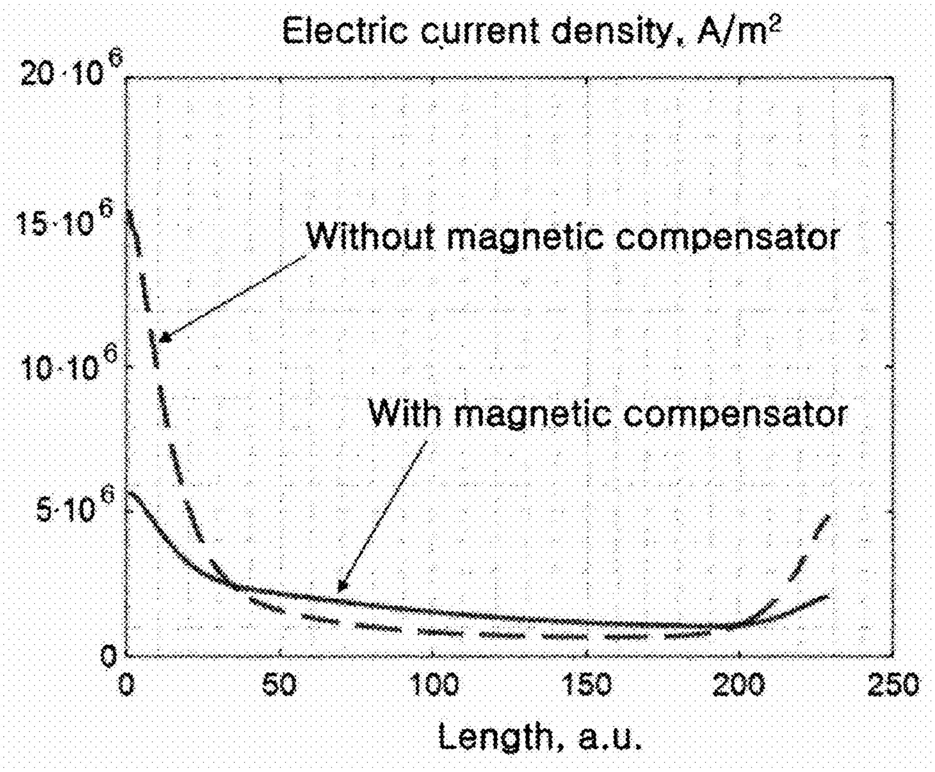
FIG. 3 is a graph showing an effect of a magnetic compensator in the multilayer inductor of FIG. 1 according to an embodiment of the disclosure.

FIG. 3 is a graph showing an effect of the magnetic compensator in the multilayer inductor of FIG. 1 according to an embodiment of the disclosure.

Referring to the graph of FIG. 3, the horizontal axis denotes a location in a width direction of the multilayer winding portion 10 of the multilayer inductor, and the vertical axis denotes a current density flowing in the multilayer winding portion 10 of the multilayer inductor. In FIG. 3, a solid line denotes a case when there is the magnetic compensator 20, and a dashed line denotes a case when there is no magnetic compensator 20. The width direction of the multilayer winding portion 10 may be a diameter direction. On the horizontal axis of FIG. 3, a position of 0 a.u. is a position of an inner surface (10*a* of FIG. 2) where the multilayer winding portion 10 meets the first magnetic wall 21 of the magnetic compensator 20, and a position of 230 a.u. is a position of the outer surface 10*b* where the multilayer winding portion 10 meets the second magnetic wall 22 of the magnetic compensator 20.

Referring to the dashed line of FIG. 3, when there is no magnetic compensator, a current density in the multilayer winding portion 10 of the multilayer inductor has “deep” in the middle of the width direction of the multilayer winding portion 10, and the maximum value at both edges of the multilayer winding portion 10. As is known as Lenz’s law, at high operating frequency, a considerable portion of a current flows in an edge of a conductive wire of the multilayer winding portion 10, and thus, an effective cross-sectional area of the conductive wire (conductor) is reduced. Accordingly, FIG. 3 illustrates that, when there is no magnetic compensator, high loss and ineffective use of the conductive wire (conductor) of the multilayer winding portion 10 are accompanied.

When the magnetic compensator 20 in a wall shape is present at both side surfaces of the multilayer winding portion 10, the current density of the multilayer winding portion 10 is more uniformly distributed, as indicated by the solid line of FIG. 3, compared with a case without a magnetic compensator. The maximum value of the current density at the edge, that is, the inner surface 10*a* and the outer surface 10*b* of the multilayer winding portion 10 is considerably reduced, compared with the case without a magnetic compensator, and the current density in the middle portion of the multilayer winding portion 10 is increased.

As described above, FIG. 3 shows that, as the magnetic compensator 20 provides a more uniform current distribution across the cross-section of the multilayer winding portion 10, the effective cross-section of the conductive wire (conductor) of the multilayer winding portion 10 is increased and loss is decreased.

Although the multilayer inductor according to the embodiment of FIGS. 1 and 2 is described as having a shape of a circular inductor having a circular coil, the disclosure is not limited thereto.

Figure 4:
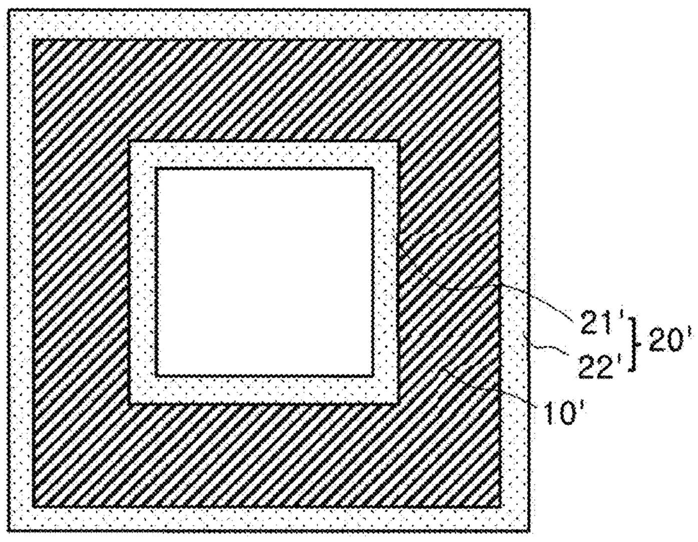
FIG. 4 is a schematic plan view of a multilayer inductor according to an embodiment of the disclosure.

FIG. 4 is a schematic plan view of a multilayer inductor according to an embodiment of the disclosure.

Referring to FIG. 4, the multilayer inductor may have a rectangle inductor shape and include a multilayer winding portion 10' formed of coils having a hollow rectangular shape and a magnetic compensator 20' having first and second magnetic walls 21' and 22' that are provided on an inner surface and an outer surface of the multilayer winding portion 10' and each have a rectangular shape.

Figure 5:
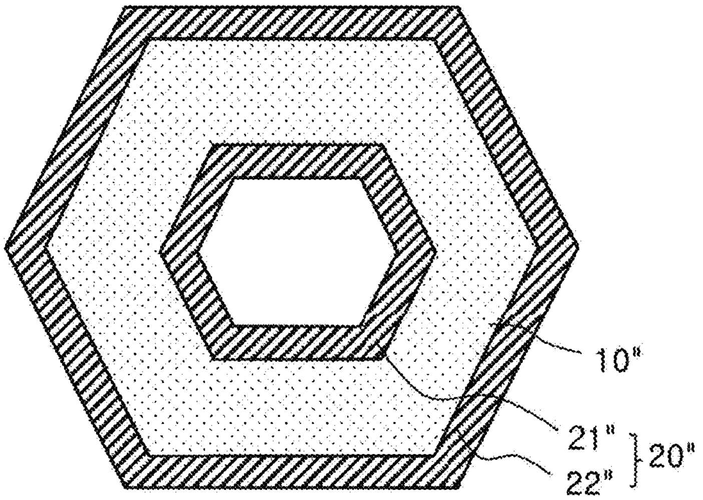
FIG. 5 is a schematic cross-sectional view of a multilayer inductor according to an embodiment of the disclosure.

FIG. 5 is a schematic plan view of a multilayer inductor according to an embodiment of the disclosure.

Referring to FIG. 5, the multilayer inductor may have a hexagonal inductor shape including a multilayer winding portion 10" formed of coils having a hollow hexagonal shape and a magnetic compensator 20" having first and second magnetic walls 21" and 22" that are provided on an inner surface and an outer surface of the multilayer winding portion 10" and each have a hexagonal shape.

The inductor may have any suitable geometric shape in a plan view, for example, triangular, polygonal, oval, etc., depending on the purpose, design features, and required parameters.

The multilayer inductor of the embodiment with reference to FIGS. 1 and 2 is described with an example in which the first and second magnetic walls 21 and 22 have a rectangular cross-sectional shape, but the disclosure is not limited thereto.

Figure 6:
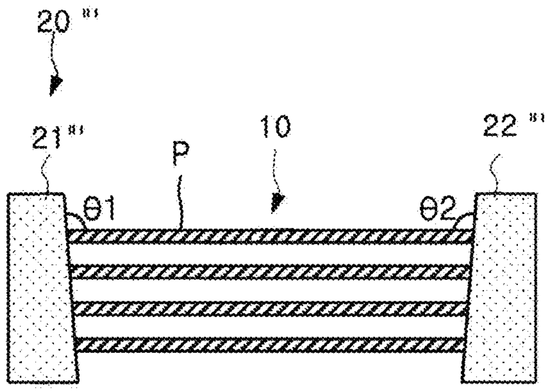
FIG. 6 is a schematic side view of a multilayer inductor according to an embodiment of the disclosure.

FIG. 6 is a schematic side view of a multilayer inductor according to an embodiment of the disclosure.

Referring to FIG. 6, first and second magnetic walls 21" and 22" may have an inclined shape on sides facing the multilayer winding portion 10. For example, a surface of the first magnetic wall 21" facing the multilayer winding portion 10 may be arranged at an inclined angle θ1 with respect to a plane P. A surface of the second magnetic wall 22" facing the multilayer winding portion 10 may be arranged at an inclined angle θ2 with respect to a plane P. In another example, the first and second magnetic walls 21" and 22" may have a shape such as trapezoidal, triangular, etc.

Figure 7:
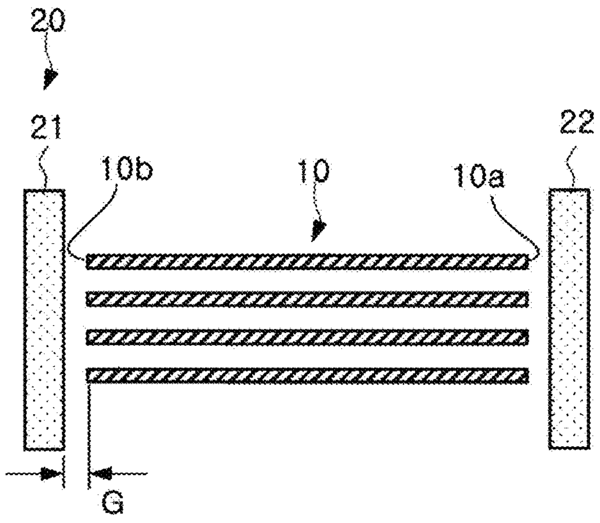
FIG. 7 is a schematic side view of a multilayer inductor according to an embodiment of the disclosure.

FIG. 7 is a schematic side view of a multilayer inductor according to an embodiment of the disclosure.

Referring to FIG. 7, the first and second magnetic walls 21 and 22 may be arranged adjacent to each other to be a certain distance apart from each of the inner surface 10*a* and the outer surface 10*b* of the multilayer winding portion 10. In other words, a gap G may be present between the magnetic compensator 20 and the multilayer winding portion 10. The gap G may be present between the magnetic compensator 20 and the multilayer winding portion 10 may be an air gap, a gap filled with a dielectric, or a combination thereof. When the gap G is filled with a dielectric, the dielectric may be the dielectric 12 located between the coil layers 11, for example, a dielectric of a printed circuit board.

Although FIG. 7 illustrates a case in which both of the first and second magnetic walls 21 and 22 are spaced apart from the multilayer winding portion 10, only any one of the first and second magnetic walls 21 and 22 may be spaced apart from the multilayer winding portion 10.

Figure 8:
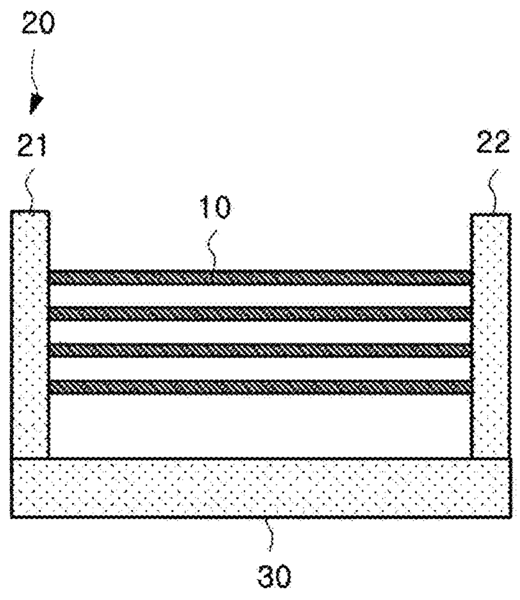
FIG. 8 is a schematic side view of a multilayer inductor according to an embodiment of the disclosure.

FIG. 8 is a schematic side view of a multilayer inductor according to an embodiment of the disclosure.

Referring to FIG. 8, a multilayer inductor of the present embodiment includes the multilayer winding portion 10 and a magnetic compensator 20. The multilayer winding portion 10 may be substantially the same as the multilayer winding in the multilayer inductor of the above-described embodiments. The magnetic compensator 20 may further include a lower magnetic portion 30 in addition to the first and second magnetic walls 21 and 22 in the multilayer inductor of the above-described embodiments. The lower magnetic portion 30 may be located on a lower surface of the multilayer winding portion 10.

The lower magnetic portion 30 may be formed of a soft magnetic material. In an embodiment, the soft magnetic material of the lower magnetic portion 30 may be a soft magnetic ferrite. In an embodiment, the lower magnetic portion 30 may be manufactured of an iron-based soft magnetic material, or an amorphous or nanocrystalline alloy-based soft magnetic material. The first and second magnetic walls 21 and 22 and the lower magnetic portion 30 may all be formed of the same material.

The lower magnetic portion 30 may be attached on lower surfaces of the first and second magnetic walls 21 and 22. Although FIG. 8 illustrates that the first and second magnetic walls 21 and 22 and the lower magnetic portion 30 are provided separately, the first and second magnetic walls 21 and 22 and the lower magnetic portion 30 may be formed integrally.

The lower magnetic portion 30 may connect the first and second magnetic walls 21 and 22 that are respectively provided on an inner wall and an outer wall of the multilayer winding portion 10, thereby shielding the multilayer inductor from the effect of an external environment.

Figure 9:
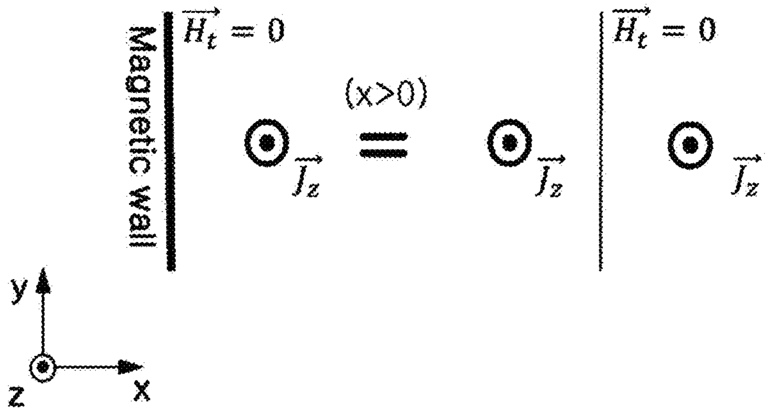
FIG. 9 illustrates an operation principle of a magnetic wall with respect to a conductive wire according to an embodiment of the disclosure.

FIG. 9 illustrates an operation principle of a magnetic wall with respect to a conductive wire according to an embodiment of the disclosure.

The left side of FIG. 9 illustrates a case in which a conductive wire perpendicular to a plane is present at some distance away from a magnetic wall. When the ground is assumed to be an x-y plane, the magnetic wall is located on a y-z plane and a conductor is arranged parallel to a Z-axis. A current flows in the conductive wire in a Z-axis direction. A tangential component of a magnetic field generated by a current flowing in the conductive wire is 0.

The right side of FIG. 9 illustrates a configuration that is magnetically equivalent to the left configuration of FIG. 9. The magnetic field generated by the current of the conductive wire is equivalent to the magnetic field generated by the current flowing in two conductive wires arranged parallel to each other, due to the presence of the magnetic wall, as in an example illustrated in FIG. 9. A second conductive wire is located symmetrically to a first conductive wire with respect to the magnetic wall. In other words, with respect to the first conductive wire located in the right ($x>0$) with respect to the magnetic wall, the second conductive wire is located in the left ($x<0$) with respect to the magnetic wall. The current flowing in the second conductive wire has the same amount as the current flowing in the first conductive wire, and flows in the same direction as the current flowing in the first conductive wire. The tangential component of the magnetic field generated by the two conductive wires becomes 0 at the location of the magnetic wall.

Figure 10:
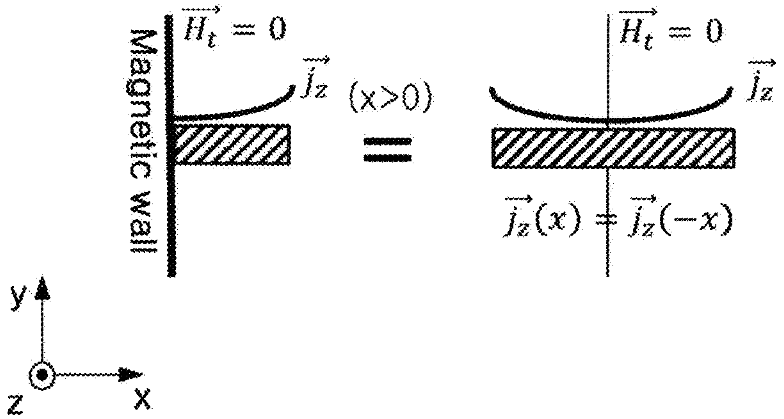
FIG. 10 illustrates an operation principle of a magnetic wall with respect to a flat conductor according to an embodiment of the disclosure.

FIG. 10 illustrates an operation principle of a magnetic wall with respect to a flat conductor according to an embodiment of the disclosure.

The left side of FIG. 10 illustrates a case in which there is a flat conductor that is perpendicular to a magnetic wall. When the ground is assumed to be an x-y plane, the magnetic wall is located on a y-z plane and a conductor is arranged on a z-x plane. A current flows in the conductive wire in a Z-axis direction. A current distribution jz across the cross-section of the conductor may have a shape as shown in a curved graph marked above the conductor.

The right side of FIG. 10 illustrates a configuration that is magnetically equivalent to the left configuration of FIG. 10. The magnetic field generated by the conductor illustrated in the left side of FIG. 10 is equivalent to the magnetic field generated by a current flowing in a flat conductor consisting of two parts that are symmetrically located with respect to the position of the magnetic wall, as illustrated in the right side FIG. 10, considering the presence of the magnetic wall therearound. The equivalent relationship of FIG. 10 as above may be understood in a similar manner to FIG. 9.

Figure 11:
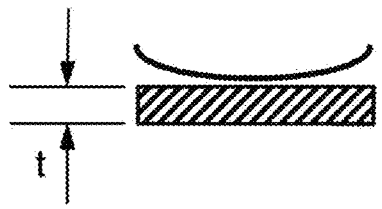
FIG. 11 illustrates a case of modeling a current density distribution in a flat conductor according to an embodiment of the disclosure.

FIG. 11 illustrates a case of modeling a current density distribution in a flat conductor according to an embodiment of the disclosure.

Figure 12:
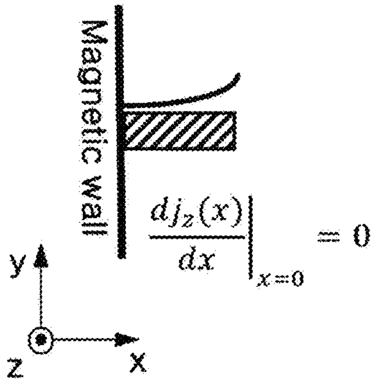
FIG. 12 illustrates a case of modeling a current density distribution in a flat conductor when a magnetic wall is present at one side according to an embodiment of the disclosure.

FIG. 12 illustrates a case of modeling a current density distribution in a flat conductor when a magnetic wall is present at one side according to an embodiment of the disclosure.

Figure 13:
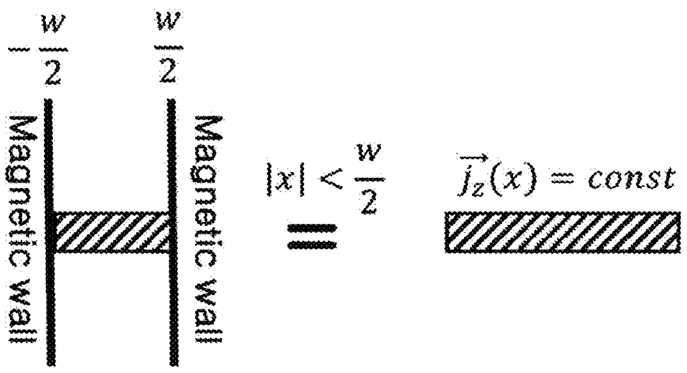
FIG. 13 illustrates a case of modeling a current density distribution in a flat conductor when magnetic walls are present at both sides according to an embodiment of the disclosure.

FIG. 13 illustrates a case of modeling a current density distribution in a flat conductor when magnetic walls are present at both sides according to an embodiment of the disclosure.

Figure 14:
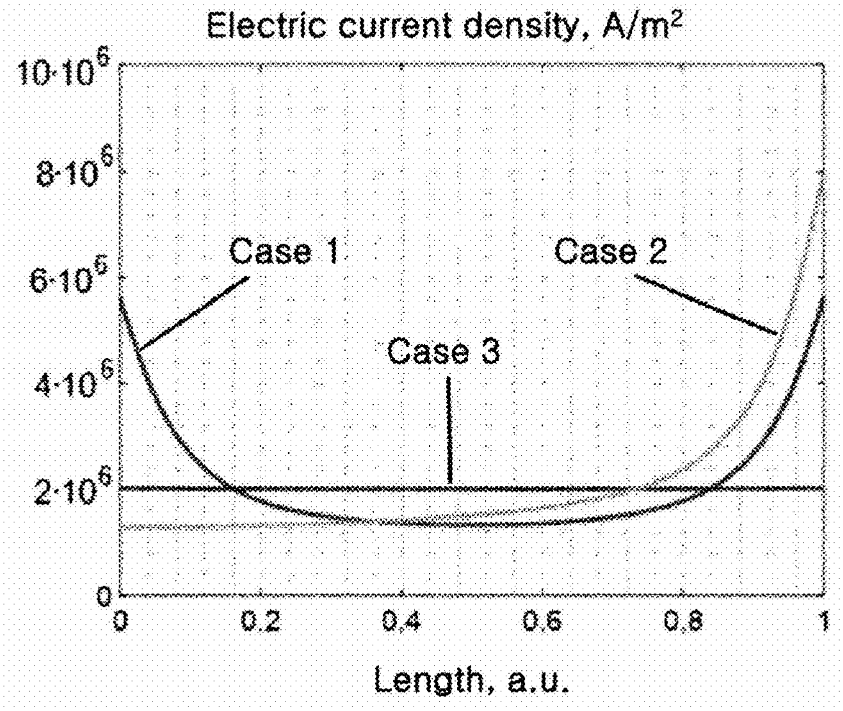
FIG. 14 shows a current density distribution in each case of FIGS. 11 to 13 according to an embodiment of the disclosure.

FIG. 14 shows a current density distribution in each case of FIGS. 11 to 13 according to an embodiment of the disclosure.

For example, FIG. 14 illustrates a modeling result of a case in which a current flows at a frequency of 100 kHz in a flat conductor that is 60 μm thick and 10 mm wide.

The distribution of a current density in a case of FIG. 11 is illustrated as Case 1 in the graph of FIG. 14. The "deep" is in the middle of the conductor and two maximum values are at edges of the conductor.

The distribution of a current density in a case of FIG. 12 is illustrated as Case 2 in the graph of FIG. 14. The magnetic wall removes a sharp increase in the current density of the conductor in the vicinity of a contact point with the magnetic wall.

The distribution of a current density in a case of FIG. 13 is illustrated as Case 3 in the graph of FIG. 14. Two magnetic walls at both sides of the conductor remove a sharp increase in the current density of the conductor in the vicinity of a contact point with the magnetic wall. As an ideal case that is a simulation of a flat conductor with two magnetic walls is the same as a flat conductor with an infinite width, a current density is uniformly distributed across the width of a conductor. Accordingly, the maximum efficiency using a conductor cross-section is achieved and loss of a conductor is reduced.

Figure 15:
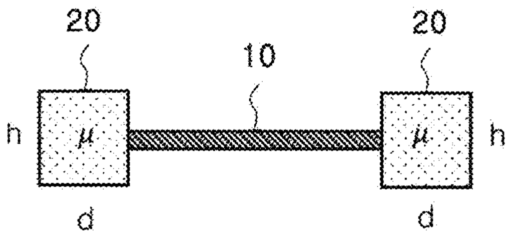
FIG. 15 illustrates a permeability of magnetic walls and a height and a thickness of the magnetic walls provided at both sides of a conductor according to an embodiment of the disclosure.

FIG. 15 illustrates the permeability of magnetic walls and the height and thickness of the magnetic walls provided at both sides of a conductor according to an embodiment of the disclosure.

Figure 16:
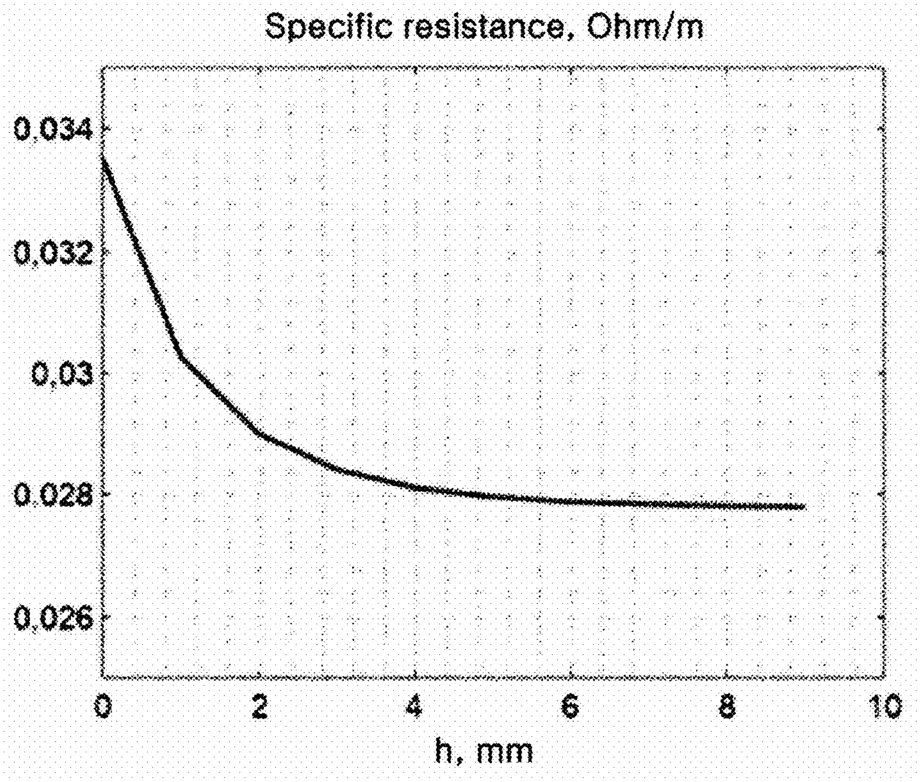
FIG. 16 is a graph showing a dependency of linear resistance of a conductor with respect to a height of magnetic walls according to an embodiment of the disclosure.

FIG. 16 is a graph showing the dependency of linear resistance of the conductor with respect to the height of magnetic walls according to an embodiment of the disclosure.

Figure 17:
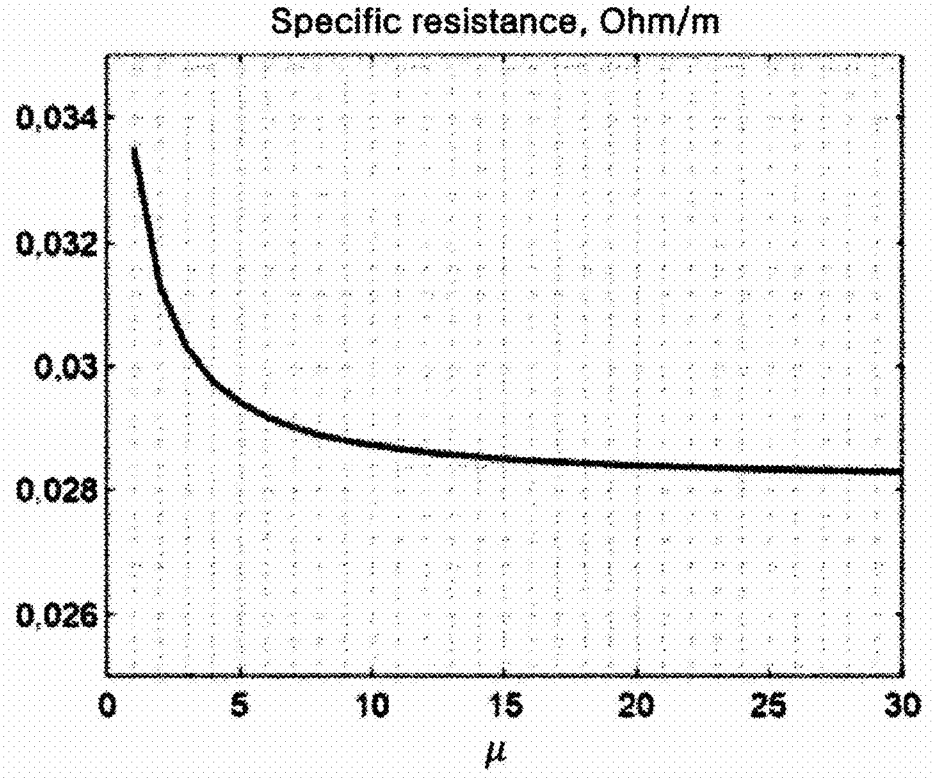
FIG. 17 is a graph showing a dependency of linear resistance of a conductor with respect to a permeability of magnetic walls according to an embodiment of the disclosure.

FIG. 17 is a graph showing the dependency of linear resistance of the conductor with respect to the permeability of magnetic walls according to an embodiment of the disclosure.

Referring to FIG. 15, the magnetic wall is substituted with a wall of a soft magnetic material having finite dimension and permeability in a specific embodiment. In an example, FIG. 15 illustrates a flat copper conductor that is 60 μm thin and 10 mm wide in which a current of a frequency of 100 kHz flows. The magnetic wall of the magnetic compensator is located at both sides of the conductor. In an embodiment, the magnetic wall is formed of ferrite. "u" denotes permeability of the magnetic wall. The finite geometric dimension and permeability reduce the effect of eliminating a sharp increase in current density near the edge of the conductor.

To determine the dependency of resistance (ohm/m) per unit length of a conductor of a magnetic compensator with respect to the height of a magnetic wall, it is assumed that the thickness of the magnetic wall is 2 mm and permeability u is 1000.

Referring to FIG. 16, in an embodiment, it may be seen that almost minimum linear resistance of the conductor is achieved from a magnetic wall height of about 4 mm of the magnetic compensator.

To determine the dependency of linear resistance of a conductor with respect to permeability of a magnetic wall of a magnetic compensator, it is assumed that the thickness and the height of the magnetic wall are 2 mm and 4 mm, respectively.

Referring to FIG. 17, in an embodiment, it may be seen that, even when a permeability value is 30, substantially minimum linear resistance of a conductor is achieved.

As active resistance of a conductor of inductor winding decreases, heating loss during inductor operation is reduced.

Accordingly, the disclosed multilayer inductor may implement a flat inductor having a high quality factor from a simple design having a magnetic compensator.

Figure 18:
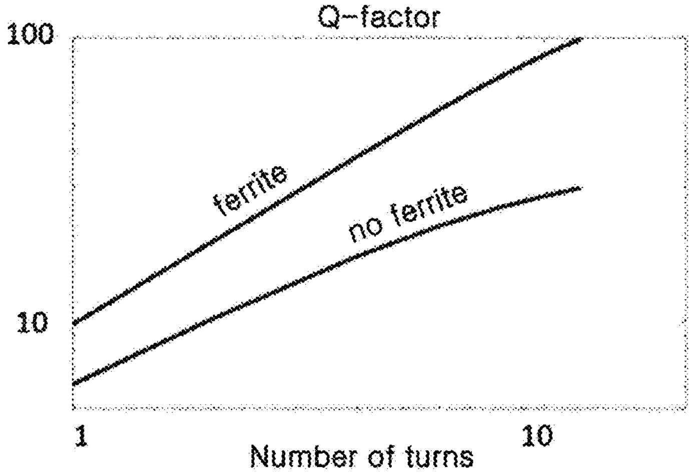
FIG. 18 is a graph showing a dependency of a quality factor of a coil with respect to a number of windings according to a presence or an absence of a magnetic compensator according to an embodiment of the disclosure.

FIG. 18 is a graph showing the dependency of a quality factor of a coil with respect to the number of windings according to the presence of the magnetic compensator according to an embodiment of the disclosure.

Referring to FIG. 18, the magnetic compensator may improve the quality factor of the multilayer inductor as the number of windings increases. When there is no magnetic compensator, the quality factor is much low, as illustrated in FIG. 18. In other words, where there is a magnetic compensator, the quality factor increase much according to the increase of the number of windings, whereas when there is no magnetic compensator, actually, the quality factor remains unchanged in spite of an increase in the number of windings (or the number of coil layers). This is because a current in a coil layer is not uniformly distributed.

Figure 19:
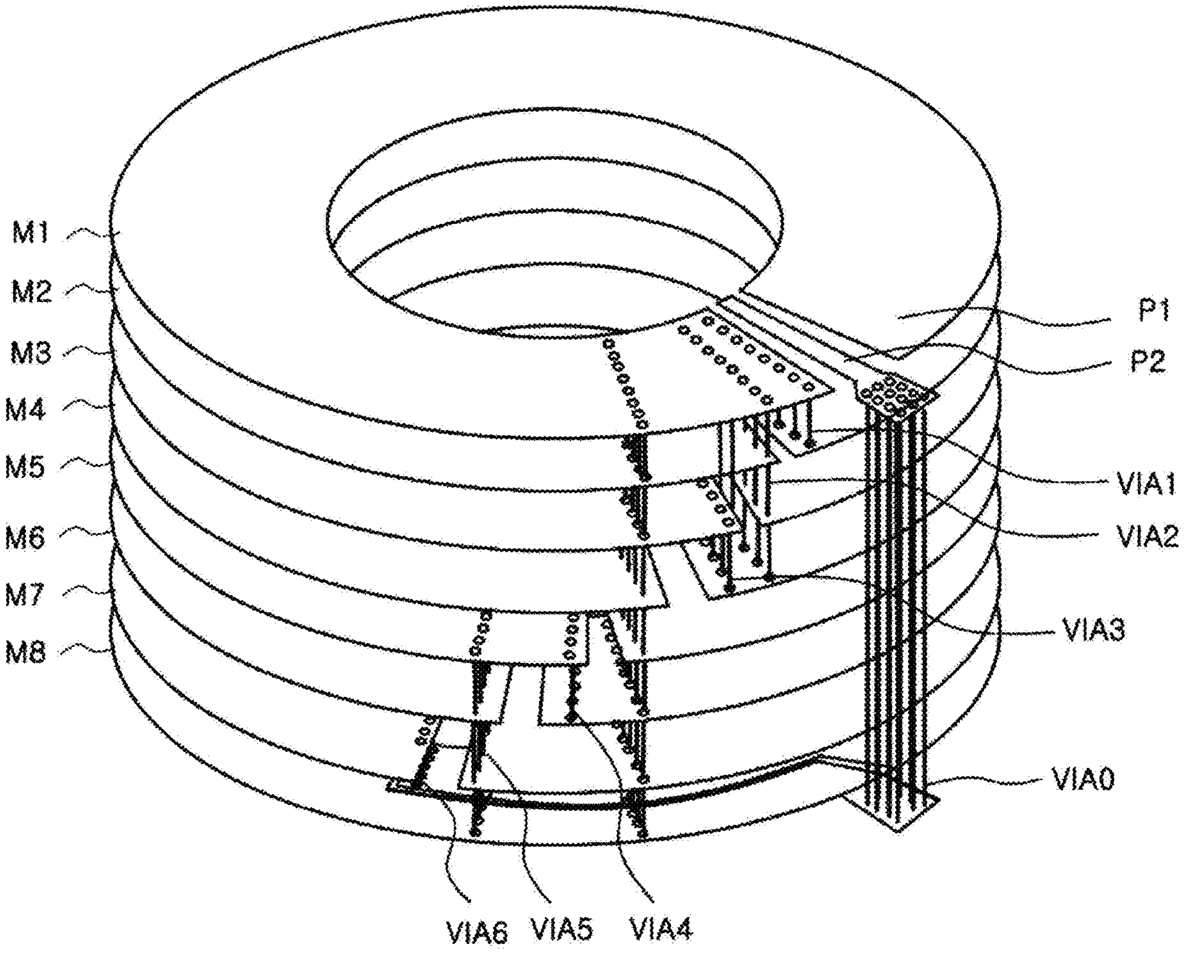
FIG. 19 is a schematic perspective view of a multilayer inductor according to an embodiment of the disclosure.

FIG. 19 is a schematic perspective view of a multilayer inductor according to an embodiment of the disclosure.

Figure 20:
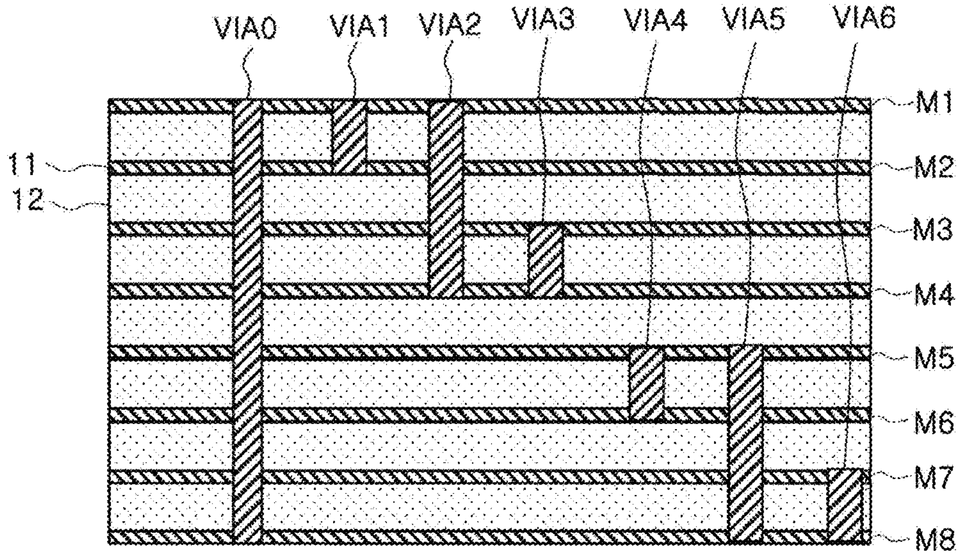
FIG. 20 schematically illustrates an example of a wiring of coil layers of the multilayer inductor of FIG. 19 according to an embodiment of the disclosure.

FIG. 20 schematically illustrates an example of a wiring of coil layers of the multilayer inductor of FIG. 19 according to an embodiment of the disclosure.

Referring to FIGS. 19 and 20, a multilayer winding portion of the multilayer inductor is formed based on a printed circuit board. Each layer of the multilayer winding portion may be a printed circuit board, that is, the dielectric 12 on which a conductor, that is, a circuit layer 11, is deposited. To manufacture the multilayer winding portion, the layers of the multilayer winding portion are connected to each other by punching and plating holes of the printed circuit board, and a current path is formed between the conductors of winding layers. The multilayer inductor consists of eight coil layers M1, M2, M3, M3, M4, M5, M6, M7, and M8 that are connected in series, and each coil layer is based on a printed circuit board. The conductor of each layer of the coil layers M1, M2, M3, M3, M4, M5, M6, M7, and M8 is formed on the dielectric 12 of the printed circuit board, and the coil layers M1, M2, M3, M3, M4, M5, M6, M7, and M8 are separated from each other by the dielectric 12. The conductors of the coil layers M1, M2, M3, M3, M4, M5, M6, M7, and M8 may be electrically connected to each other via, for example, a metalized via. In an embodiment, VIA1, VIA3, VIA4, and VIA6 may be punched in the printed circuit board in an initial production process before forming the multilayer winding portion by bonding the printed circuit board. VIA2 and VIA3 may be drilled after the first bonding of M1-M4 layers and M5-M8 layers. VIA0 (through-hole) may be punched after the final bonding. The coil layers and the corresponding VIAs for connecting the coil layers may be designed to provide a current flow direction that is required by the multilayer inductor to form a desired magnetic field. Alternatively, the coil layers M1, M2, M3, M3, M4, M5, M6, M7, and M8 may be connected to each other by other well-known electrical connection devices.

Figure 21:
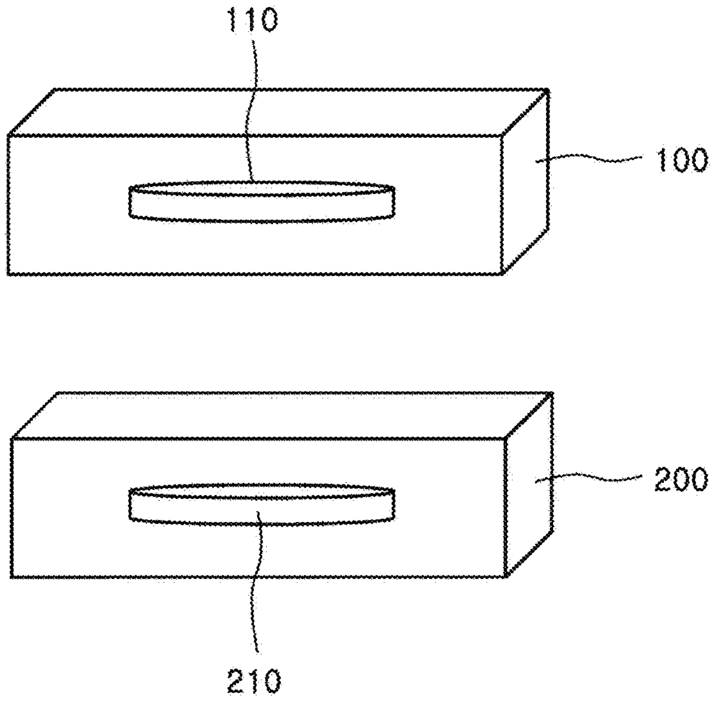
FIG. 21 schematically illustrates a wireless power transmission system according to an embodiment of the disclosure.

FIG. 21 schematically illustrates a wireless power transmission system according to an embodiment of the disclosure.

Referring to FIG. 21, the multilayer inductors of the above-described embodiments may be applied in a wireless power transmission system. In an embodiment, the wireless power transmission system may include a power transmitter 100 including a wireless power transmission inductor 110, and a power receiver 200 including a wireless power receiving inductor 210. The multilayer inductors of the above-described embodiments may be the wireless power transmission inductor 110 and/or the wireless power receiving inductor 210, and accordingly, the wireless power transmission system may have a simple structure and highly efficient power transmission.

In an embodiment, the wireless power transmission system may be used in a wireless charging system of a mobile electronic device. The mobile electronic device needs to increase power transmission efficiency and reduce the overall size of the wireless power transmission system in order to make the mobile electronic device compact, and the multilayer inductors of the above-described embodiments may be of great help to achieve the required levels of a mobile electronic device.

In an embodiment, the above-described wireless power transmission system may be used to exclude wired connections having low mechanical and strength characteristics by transmitting power between different parts of a robot connected to each other through joints or other movable joints.

The features recited in the various dependent claims as well as the implementations disclosed in various parts of this specification may be combined to achieve advantageous effects even if the possibility of such combinations is not explicitly disclosed.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A multilayer inductor comprising:

a multilayer winding portion comprising a plurality of coil layers that are stacked in a vertical direction, multilayer winding portion having an inner surface that defines a hollow of the plurality of coil layers and having an outer surface that defines an outer side; and a magnetic compensator comprising a soft magnetic material and a magnetic wall located in at least one of the inner surface or the outer surface of the multilayer winding portion, wherein a surface of the magnetic wall directly in contact with the multilayer winding portion is arranged at an inclined angle with respect to a plane perpendicular to the vertical direction.

2. The multilayer inductor of claim 1, wherein each layer of the plurality of coil layers comprises a single-turn or multi-turn field coil.

3. The multilayer inductor of claim 1, wherein the magnetic wall comprises a first magnetic wall and a second magnetic wall that are respectively provided on the inner surface and the outer surface of the multilayer winding portion, and wherein the magnetic compensator further comprises a lower magnetic portion that connects the first magnetic wall and the second magnetic wall to each other and on which the multilayer winding portion is placed.

4. The multilayer inductor of claim 1, wherein the soft magnetic material of the magnetic compensator is ferrite.

5. The multilayer inductor of claim 1, wherein the magnetic wall is attached to at least one of the inner surface or the outer surface of the multilayer winding portion.

6. The multilayer inductor of claim 1, wherein the magnetic wall is spaced apart from at least one of the inner surface or the outer surface of the multilayer winding portion.

7. The multilayer inductor of claim 6, wherein a gap between the magnetic wall and the multilayer winding portion is an air gap or is filled with a dielectric material.

8. The multilayer inductor of claim 1, wherein the magnetic wall comprises a first magnetic wall and a second magnetic wall that are respectively provided on the inner surface and the outer surface of the multilayer winding portion, and wherein the first magnetic wall and the second magnetic wall are parallel to each other.

9. The multilayer inductor of claim 1, wherein, when viewed from a plane on which the plurality of coil layers are placed, the multilayer winding portion has an annular shape or a hollow polygonal shape, and the magnetic wall has an annular shape or a hollow polygonal shape corresponding to the shape of the multilayer winding portion.

10. The multilayer inductor of claim 1, wherein the plurality of coil layers are provided on a multilayer printed circuit board.

11. The multilayer inductor of claim 10, wherein the plurality of coil layers are mutually connected by a metalized via.

12. The multilayer inductor of claim 1, wherein each of the plurality of coil layers is formed on a single layer printed circuit board, and wherein the plurality of coil layers are formed by stacking single layer printed circuit boards.

13. A wireless power transmission system comprising:

a power transmitter comprising a wireless power transmission inductor; and a power receiver comprising a wireless power receiving inductor, wherein an inductor of at least one of the power transmitter or the power receiver is a multilayer inductor comprising:

a multilayer winding portion comprising a plurality of coil layers that are stacked in a vertical direction, and multilayer winding portion having an inner surface that defines a hollow of the plurality of coil layers and having an outer surface that defines an outer side; and a magnetic compensator comprising a soft magnetic material and comprising a magnetic wall located in at least one of the inner surface or the outer surface of the multilayer winding portion, and wherein a surface of the magnetic wall directly in contact with the multilayer winding portion is arranged at an inclined angle with respect to a plane perpendicular to the vertical direction.

* * * * *